United States Patent
Sung et al.

(10) Patent No.: US 8,645,487 B2
(45) Date of Patent: Feb. 4, 2014

(54) METHOD OF REQUESTING SERVICES OF NETWORK DEVICES, NETWORK DEVICES CAPABLE OF PERFORMING THE METHOD, AND STORAGE MEDIUM FOR STORING THE METHOD

(75) Inventors: Hyun-ah Sung, Seoul (KR); Dae-gyu Bae, Suwon-si (KR); Jin-woo Hong, Suwon-si (KR); Se-hoon Moon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 947 days.

(21) Appl. No.: 11/637,062

(22) Filed: Dec. 12, 2006

(65) Prior Publication Data

US 2007/0288608 A1 Dec. 13, 2007

(30) Foreign Application Priority Data

Jun. 7, 2006 (KR) .................. 10-2006-0050872

(51) Int. Cl.
*G06F 15/167* (2006.01)
(52) U.S. Cl.
USPC ............................ 709/216; 709/203; 707/602
(58) Field of Classification Search
USPC .......................................................... 709/216
See application file for complete search history.

(56) References Cited

U.S. PATENT DOCUMENTS

| | | | |
|---|---|---|---|
| 6,466,971 B1 * | 10/2002 | Humpleman et al. | 709/220 |
| 6,546,419 B1 * | 4/2003 | Humpleman et al. | 709/223 |
| 6,910,068 B2 * | 6/2005 | Zintel et al. | 709/220 |
| 7,218,714 B2 | 5/2007 | Liu et al. | |
| 7,437,434 B2 * | 10/2008 | Zintel et al. | 709/220 |
| 7,441,019 B2 * | 10/2008 | Zintel et al. | 709/220 |
| 7,962,097 B2 | 6/2011 | Jung et al. | |
| 2002/0029256 A1 * | 3/2002 | Zintel et al. | 709/218 |
| 2002/0062406 A1 * | 5/2002 | Chang et al. | 710/1 |
| 2003/0046437 A1 * | 3/2003 | Eytchison et al. | 709/250 |
| 2004/0088731 A1 * | 5/2004 | Putterman et al. | 725/94 |

(Continued)

FOREIGN PATENT DOCUMENTS

KR 10-2003-0088203 A 11/2003
KR 10-2004-0067686 A 7/2004

(Continued)

OTHER PUBLICATIONS

Communication dated Jul. 31, 2007 from the Korean Intellectual Property Office in a counterpart application No. 10-2006-0050872.

*Primary Examiner* — Tauqir Hussain
(74) *Attorney, Agent, or Firm* — Sughrue Mion, PLLC

(57) ABSTRACT

A method and apparatus of requesting service between network devices in which the range of service between network devices can be flexibly managed, a network device capable of performing the method, and a storage medium thereof are provided. The network devices includes: a network device requesting a partner network device to send service information; and if service information of the partner network device is received, requesting a service to the partner network device based on the received service information.

11 Claims, 9 Drawing Sheets

(56) References Cited

U.S. PATENT DOCUMENTS

| | | |
|---|---|---|
| 2004/0150546 A1 | 8/2004 | Choi |
| 2004/0230330 A1* | 11/2004 | Maymudes .................. 700/83 |
| 2004/0243694 A1* | 12/2004 | Weast ........................ 709/223 |
| 2004/0243700 A1* | 12/2004 | Weast ........................ 709/224 |
| 2005/0055352 A1* | 3/2005 | White et al. ................. 707/10 |
| 2005/0120132 A1* | 6/2005 | Hutter ........................ 709/234 |
| 2005/0276229 A1 | 12/2005 | Torabi |
| 2006/0112074 A1 | 5/2006 | Han |
| 2006/0155802 A1 | 7/2006 | He et al. |
| 2007/0220024 A1* | 9/2007 | Putterman et al. ........... 707/101 |

FOREIGN PATENT DOCUMENTS

| | | |
|---|---|---|
| KR | 10200440066953 A | 7/2004 |
| KR | 10-2005-0012250 A | 1/2005 |
| KR | 10-2005-0084289 A | 8/2005 |
| KR | 10-2006-0039280 A | 5/2006 |
| KR | 10-2006-0056192 A | 5/2006 |

* cited by examiner

| OPERATION ID | USER OPERATION |
|---|---|
| 00 | SELECT |
| 01 | UP |
| 02 | DOWN |
| 03 | LEFT |
| 04 | RIGHT |
| 05 | RIGHT-UP |
| 06 | RIGHT-DOWN |
| 07 | LEFT-UP |
| 08 | LEFT-DOWN |
| 09 | ROOT-MENU |

| OPERATION ID | USER OPERATION |
|---|---|
| 40 | POWER |
| 41 | VOLUME UP |
| 42 | VOLUME DOWN |
| 43 | MUTE |
| 44 | PLAY |
| 45 | STOP |
| 46 | PAUSE |
| 47 | RECORD |
| 48 | REWIND |
| 49 | FAST FORWARD |

```
<....>
  ...
  <Operation name='Play' id=1 ... >
    <Parameter name='FILENAME' id=5 type=file .../>
  </Operation>
  <Operation name='Stop' id=2 .../>
  <Operation name='PIP VIEW' id=3 ...>
    <Parameter name='SCREEN SIZE' id=4 type=select ...>
      <Value item='1/2:1/4'/>
    </Parameter>
  </Operation>
  ...
<....>
```

METHOD OF REQUESTING SERVICES OF NETWORK DEVICES, NETWORK DEVICES CAPABLE OF PERFORMING THE METHOD, AND STORAGE MEDIUM FOR STORING THE METHOD

CROSS-REFERENCE TO RELATED PATENT APPLICATIONS

This application claims priority from Korean Patent Application No. 10-2006-0050872, filed on Jun. 7, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a method of requesting service that can be used between network devices, and more particularly, to a method of requesting services between network devices in which a range of service that can be used between network devices can be flexibly managed, a network device capable of performing the method, and a storage medium for storing the method.

2. Description of the Related Art

Network devices may include consumer electronic (CE) devices, such as camcorders, compact disc (CD) players, digital versatile disc (DVD) players, audio players, digital televisions (DTV), and home theater systems.

A request for service that can be used between these network devices is performed based on predefined operations. For example, if a user wants to watch a DVD content file of a DVD player on a TV, a "play" command, which is already recognized by both the TV and the DVD player, is transmitted from the TV and the DVD player so that the service can begin. At this time, for the "play" command, identification (ID) information based on an operation between the TV and the DVD player as illustrated in FIG. 1, can be transferred from the TV and the DVD player. FIG. 1 illustrates an example of ID information for operations between network devices and user operations corresponding to the ID information, according to a conventional technology.

Thus, network devices can request services that can be used between network devices based on these predetermined operations. Accordingly, if a network device having a new function is connected to a network, or a new function is added to a network device, network devices cannot request services for the new functions. In order to request a service for a new function, network devices need to be updated with information on the new operations, and the updated operation information should be shared between network devices. Additionally, when information is updated, operation information (for example, operation ID information) to be allocated to a new function should not overlap the already defined operation information.

In addition, although existing network devices can request a service based on operations shared between network devices by requesting the service that can be used between the network devices based on the predefined operations, the network devices cannot request services based on a specific function of a network device. Accordingly, the range of services that can be used between network devices is limited.

SUMMARY OF THE INVENTION

The present invention provides a method of requesting service between network devices in which the range of service between network devices can be flexibly managed, a network device capable of performing the method, and a storage medium thereof.

The present invention also provides a method of requesting service between network devices capable of requesting service based on functions of network devices, a network device capable of performing the method, and a storage medium thereof.

According to an aspect of the present invention, there is provided a method of requesting service between network devices including: requesting a partner network device by a network device to send service information; and if service information of the partner network device is received, requesting a service from the partner network device based on the received service information.

The requesting of the service may include outputting the received service information; and if one service is selected based on the output service information, requesting the selected service from the partner network device.

According to another aspect of the present invention, there is provided a method of requesting a service between network devices, the method including: if a service information request from a partner network device is received, transmitting service information based on a function of a network device to the partner network device; if a service request from the partner network device is received, determining whether or not the requested service can be performed; and transmitting a service response based on the determination result to the service request, to the partner network device.

According to another aspect of the present invention, there is provided a network device including: a transmission and reception module transmitting and receiving information between a network device and a partner network device; a storage module storing service information of the partner network device; a user interface module outputting the service information of the partner network device received through the transmission and reception module; and a service request module transmitting a service information request to the partner network device through the transmission and reception module, and if the service information of the partner network device is received through the transmission and reception module, storing the service information in the storage module while transmitting the service information to the user interface module, and if service information selected from the user interface module is received, requesting the selected service based on the service information stored in the storage module, to the partner network device, through the transmission and reception module.

The storage module may further store service information based on the function of the network device, and the network device may further include a service response module transmitting service information based on the function of the network device stored in the storage module, to the partner network device through the transmission and reception module, if a service information request from the partner network device is received through the transmission and reception module.

According to another aspect of the present invention, there is provided a computer readable recording medium having embodied thereon a computer program for executing a method of requesting service between network devices, wherein the method includes: a network device requesting a partner network device to send service information; and if service information of the partner network device is received, requesting a service to the partner network device based on the received service information.

According to another aspect of the present invention, there is provided a computer readable recording medium having embodied thereon a computer program for executing a method of requesting a service between network devices, wherein the method includes: if a service information request from a partner network device is received, transmitting service information based on a function of a network device to the partner network device; and if a service request from the partner network device is received, determining whether or not the requested service can be performed and based on the determination result, transmitting a service response to the service request, to the partner network device.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE EXEMPLARY EMBODIMENTS

The present invention will now be described more fully with reference to the accompanying drawings, in which exemplary embodiments of the invention are shown.

Figures 1, 2:
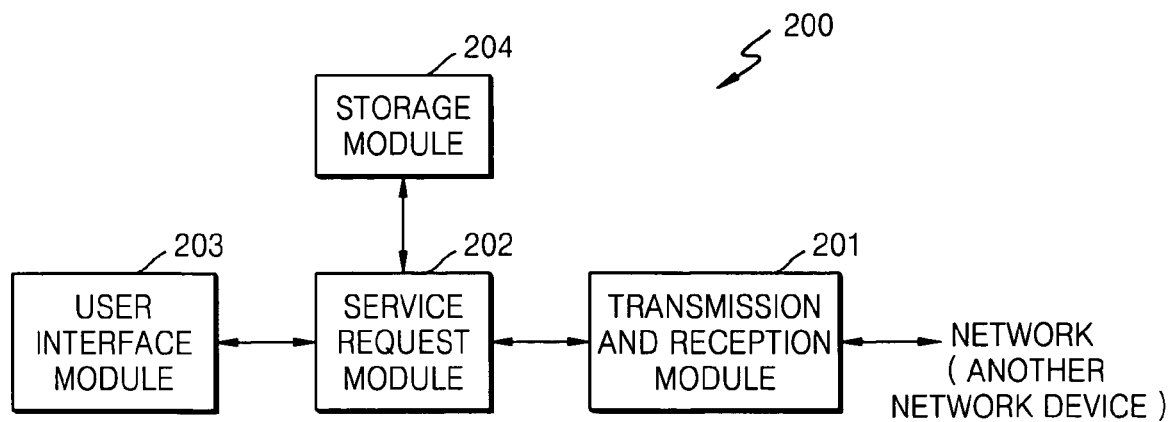
FIG. 1 illustrates an example of identification (ID) information for operations between network devices and user operations corresponding to the ID information, according to a conventional technology.
FIG. 2 is a functional block diagram illustrating a network device according to an exemplary embodiment of the present invention.

FIG. 2 is a functional block diagram illustrating a network device 200 according to an exemplary embodiment of the present invention. The network device 200 may include consumer electronic (CE) devices, such as camcorders, compact disc (CD) players, digital versatile disc (DVD) players, audio players, digital televisions (DTV), and home theater systems. The CE device can be connected to a network.

Referring to FIG. 2, the network device 200 comprises a transmission and reception module 201, a service request module 202, a user interface module 203, and a storage module 204.

The transmission and reception module 201 transmits and receives information between the network device 200 and a partner network device (not shown) that is connected with the network device 200. In particular, according to the present exemplary embodiment, the transmission and reception module 201 transmits a service information request and a service request to the partner network device, and receives service information and a response to the service request from the partner network device. The received service information and response to the service request are transmitted to the service request module 202. The partner network is a device that may be controlled by the network device 200 and the network device 200 is a device controlling the partner network device. The partner network device may include a CE device that can be connected to a network like the network device 200.

If a service information request for the partner network device is received from the user interface module 203, the service request module 202 transmits the service information request to the partner network device through the transmission and reception module 201.

If the service information of the partner network device is received through the transmission and reception module 201, the service request module 202 stores the received service information in the storage module 204 and transmits the received service information to the user interface module 203. Accordingly, the storage module 204 stores the service information of the partner network device.

Figures 3, 4:
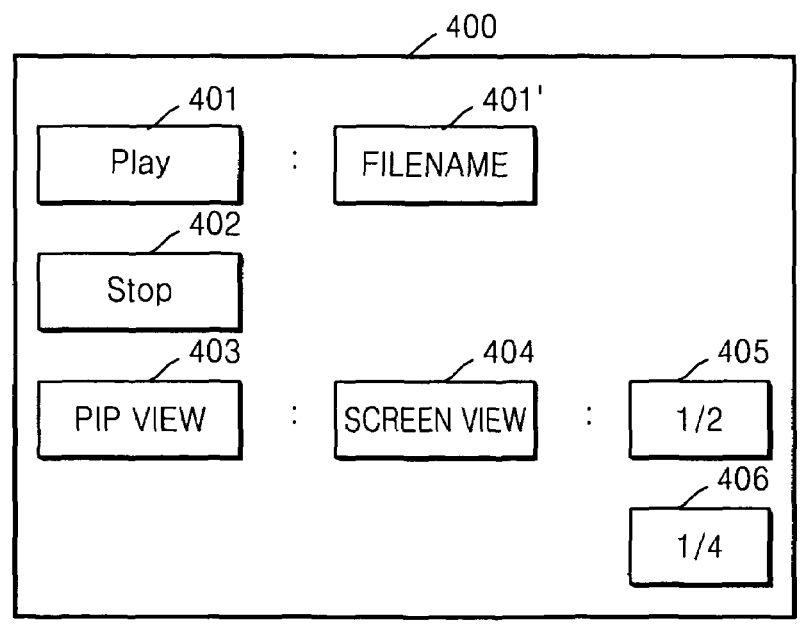
FIG. 3 is an example of a service description of a network device according to an exemplary embodiment of the present invention.
FIG. 4 illustrates a menu screen corresponding to the service description of FIG. 3 according to an exemplary embodiment of the present invention.

The service information may include a service description based on a function of the partner network device. FIG. 3 illustrates an example of a service description of a network device. As illustrated in FIG. 3, the service description may have a text-based structure using an extensible markup language (XML), and may also have a frame format. As can be seen from FIG. 3, the service description includes a service name and service identification (ID) information. In FIG. 3, the service names are "Play", "Stop", and "PIP view", and service ID information items corresponding to the service names are "id=1", "id=2", and "id=3", respectively. The services names are defined in the form of text. Accordingly, the service description can be expressed as information combining the service name and the service ID information, or as information combining text and service ID information.

The service description of a network device can further include a parameter as can be seen in FIG. 3. Parameter information included in the service description can be defined so that a parameter name and parameter ID information are included or a parameter value is further included. In FIG. 3, "filename" and "view screen" are parameter names, and parameter ID information items corresponding to the parameter names are "id=5" and "id=4", respectively. Parameter values are defined as "value item" and there are two parameter values, "½" and "¼". The parameters included in the service description of FIG. 3 can be input or selected by a user. Though a parameter value is not included in the service description, the user can input or select the parameter value.

However, there may be a parameter that is not included in the service description but should be allocated dynamically for communication between the network device 200 and the partner network device. An example of such a parameter which should be allocated dynamically for communication between the network device 200 and the partner network device is stream ID information (stream_id). The stream ID information is an identifier for managing each stream in communication between network devices and can be allocated dynamically by the service request module 202 according to a preset protocol used between the network device 200 and the partner network device. The parameter thus allocated dynamically has nothing to do with the user's input or selection.

Meanwhile, if the received service information is defined as the service description as illustrated in FIG. 3, the user interface module 204 can output a menu screen as illustrated in FIG. 4. FIG. 4 illustrates the menu screen corresponding to the service description of FIG. 3. The menu screen 400 of FIG. 4 is a text-based menu screen. However, a menu screen corresponding to the service description can be defined as an image-based menu screen to indicate each operation. Accordingly, the user can identify service contents provided by the partner network device and based on this, the user can select or input a desired service.

For example, if the user selects "Play" 401 based on the menu screen 400 illustrated in FIG. 4, the user interface module 203 informs the service request module that "Play" 401 is selected.

Accordingly, the service request module 202 detects ID information (id=1) corresponding to "Play" 401 based on service information of the partner network device stored in the storage module 204, and detects ID information (id=5) corresponding to the parameter name "Filename" 401'. The service request module 202 forms a service request frame including the detected ID information items. The formed service request frame can be defined as illustrated in FIG. 5.

Figure 5:
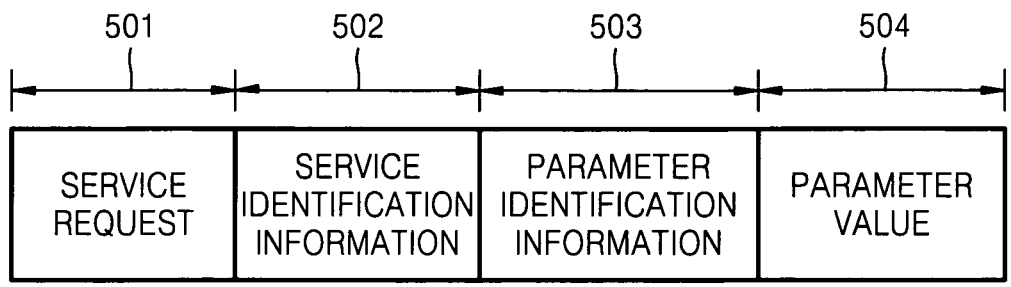
FIG. 5 illustrates a structure of a service request frame formed in a service request module of FIG. 2 according to an exemplary embodiment of the present invention.

FIG. 5 illustrates a structure of a service request frame formed in the service request module 202. The service request frame includes a field 501 indicating that the frame is a service request frame, a service ID information field 502, a parameter ID information field 503, and a parameter value field 504. In FIG. 5, whether or not to add the parameter ID information field 503 and the parameter value field 504 is determined according to whether or not a parameter to be transmitted to the partner network device exists. For example, if the "Play" function described above is selected based on the menu screen 400 illustrated in FIG. 4, since parameter ID information (id=5) exists in case of FIG. 3, the service request module 202 forms a service request frame to which the parameter ID information field 503 and the parameter value field 504 are added. Here, in the parameter value field 504, a filename selected by the user is included. The filename included in the parameter value field may be input directly by the user in the area 401' of FIG. 4 or may be selected among filenames searched from the partner network device by using an application such as Windows Explorer.

Also, if the user selects "Stop" 402 based on the menu screen 400 illustrated in FIG. 4, the user interface module 202 informs the service request module 202 that "Stop" is selected. Accordingly, the service request module 202 forms a service request frame including ID information (id=2) corresponding to "Stop" based on the service information of the partner network device stored in the storage module 204. The service request frame formed in the service request module 202 includes a field 501 indicating that the frame is a service request frame, and a service ID information field 502. This is because a parameter to be transmitted does not exist.

Also, if the user selects "PIP view" 403 based on the menu screen 400 illustrated in FIG. 4 and selects "½" 405 as the size of the screen view 404, the service request module 202 detects ID information (id=3) corresponding to "PIP view" based on the service information of the partner network device stored in the storage module 204, and detects parameter ID information (id=4) corresponding to the screen size, because the parameter of the screen size is selected. Then, the service request module 202 forms a service request frame including the detected ID information items and the parameter value ½.

Accordingly, the service request module 202 forms a service request frame, including the service request field 501, the service ID information field 502, the parameter ID information field 503, and the parameter value field 504 of FIG. 5. When this service request frame is formed, the service request module 202 determines whether or not to add the parameter ID information field 503 and the parameter value field 504, according to whether or not a parameter to be transmitted exists.

If the service request frame is thus formed, the service request module 202 transmits a service request based on the formed service request frame, through the transmission and reception module 201.

After the service request is transmitted, the service request module 202 can determine whether or not the partner network device performs the service request, based on a response to the service request received through the transmission and reception module 201, and can perform an operation following the determination result. For example, if the response to the service request is "OK", the service request module 202 outputs to the user interface module 203 a message that the partner network device responds "OK" to the requested service. If the response to the service request is "NOK", the service request module 202 outputs to the user interface module 203 a message that the partner network device responds "NOK" to the requested service.

Figure 6:
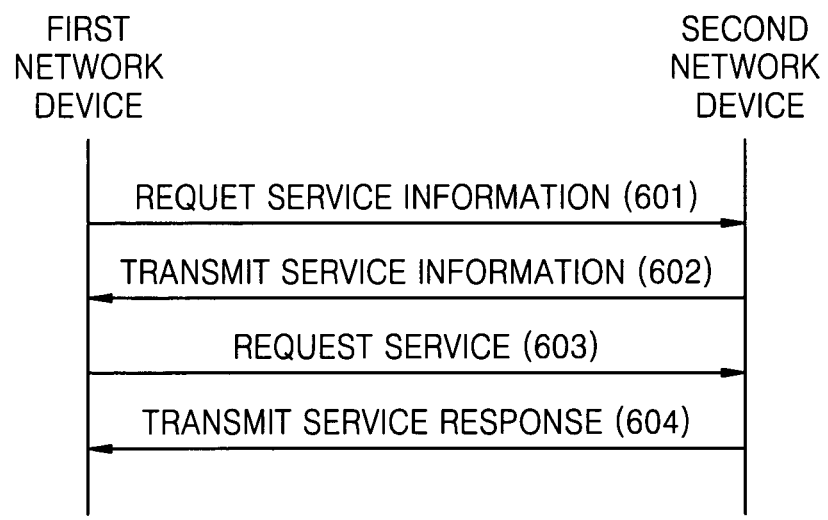
FIG. 6 is a flowchart illustrating a process of requesting services that can be used between network devices based on operations of the network device of FIG. 2 according to an exemplary embodiment of the present invention.

An example of an operation flowchart showing operations between the network device 200 and the partner network device (not shown) based on the operation of the network device 200 described above with reference to FIG. 2 is illustrated in FIG. 6. In FIG. 6, a first network device corresponds to the network device 200 of FIG. 2 and a second network device corresponds to the partner network device.

Referring to FIG. 6, if the first network requests the second network to send service information in operation 601, the second network transmits service information based on its function to the first network in operation 602. The service information includes a service description based on the function of the second network. If the first network requests one service based on the service information in operation 603, the second network determines whether or not the service requested by the first network is performed, and based on the determination result, the second network transmits a service response to the first network in operation 604.

As described above, the response may be "OK" when the second network can perform the requested service or "NOK" when the second network cannot perform the requested service.

The service request module 202 of FIG. 2 can be implemented so that a control module (not shown) controlling the function of the network device 200 can be included.

Figure 7:
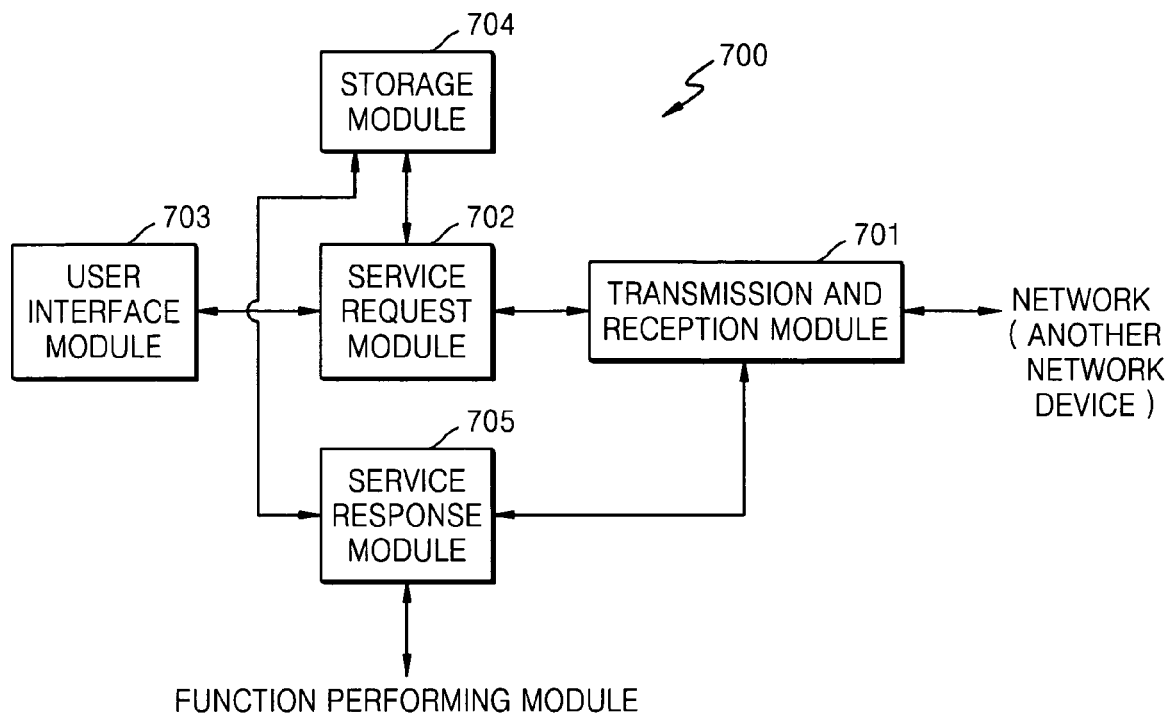
FIG. 7 is a functional block diagram of a network device according to another exemplary embodiment of the present invention.

FIG. 7 is a functional block diagram of a network device 700 according to another exemplary embodiment of the present invention. Referring to FIG. 7, the network device 700 includes a transmission and reception module 701, a service request module 702, a user interface module 703, a storage module 704, and a service response module 705.

In addition to the functions of the network device 200 illustrated in FIG. 2, the network device 700 of FIG. 7 further includes a function providing service information based on an entered function of the network device 700 when the partner network device (not shown) requests service information.

Accordingly, the service request module 702 and the user interface module 703 have the same structures and operations as those of the service request module 202 and the user interface module 203, respectively, of FIG. 2.

The storage module 704 includes service information of the partner network device transmitted and received through the transmission and reception module 701 and service information based on the function of the network device 700. The service information based on the function of the network device 700 includes a service description.

If a service information request from the partner network device is received through a network, the transmission and reception module 701 transmits the service information request to the service response module 705. The service response module 705 reads service information based on the function of the network device 700 stored in the storage module 704, and transmits the service information to the partner network device through the transmission and reception module 701. The network device 700 is a device controlled by the partner network device, and the partner network device is a device controlling the network device 700.

If the service request based on the service information of the network device 700 is received from the transmission and reception module 701, the service response module 705 determines whether or not the request service is performed by checking a function performing module (not shown) of the network device 700.

The service response module 705 transmits the determination result to the partner network device through the transmission and reception module 701.

In another implementation, the service request module 702 and the service response module 705 of FIG. 7 may be included in a control module (not shown) controlling the function of the network device 700.

Figure 8:
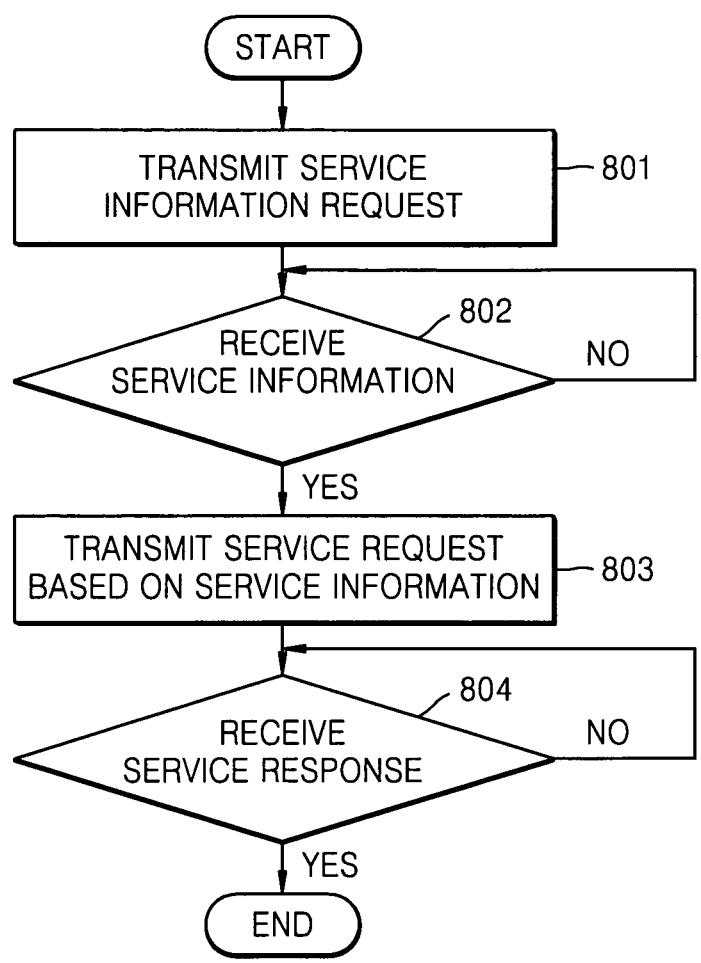
FIG. 8 is a flowchart of operations performed in a service request transmission side in a method of requesting services between network devices according to another exemplary embodiment of the present invention.

FIG. 8 is a flowchart of operations performed in a service request transmission side in a method of requesting services that are used by network devices according to another exemplary embodiment of the present invention.

First, if a user of a network device on a service request transmission side requests service information on the partner network device, the network device transmits a service information request to the partner network device in operation 801. The network device is a device controlling the partner network device as described above with reference to FIG. 2, and the partner network device is a device controlled by the network device.

If service information from the partner network device is received in operation 802, the network device transmits a service request to the partner network device based on the received service information in operation 803. The service information of the partner network device includes a service description based on the function of the partner network device. The service description can be defined as a text-based structure using the XML described above with reference to FIG. 3.

Figure 9:
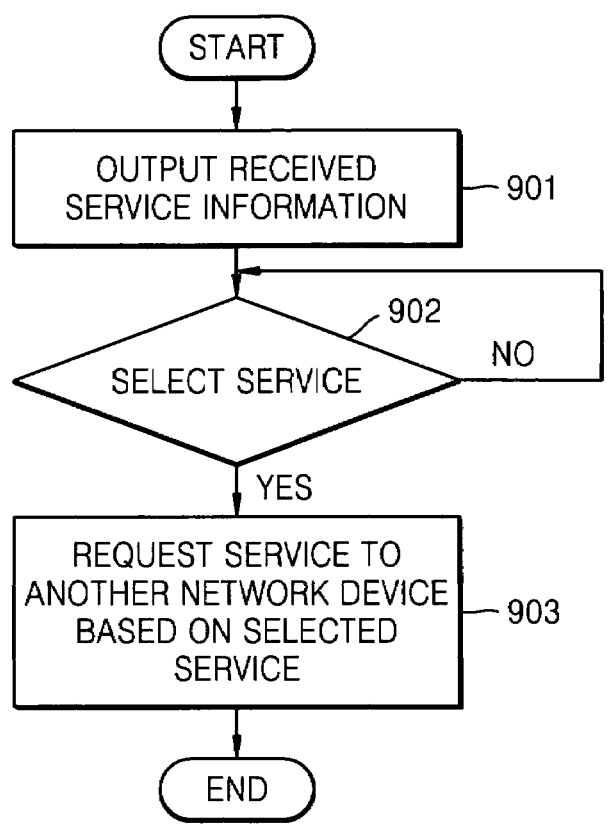
FIG. 9 is a detailed flowchart illustrating an operation of requesting services shown in FIG. 8 according to an exemplary embodiment of the present invention.

In the operation of transmitting a service request 803, the network device can operate as illustrated in FIG. 9. FIG. 9 is a detailed flowchart illustrating the operation 803 of requesting service shown in FIG. 8. Referring to FIG. 9, the network device outputs the received service information in operation 901. That is, the network device can output a text-based menu screen as illustrated in FIG. 4. However, a menu screen based on images indicating each function can also be output. Accordingly, the user can easily identify the contents of services provided by the partner network device.

If the user selects one service based on the output service information in operation 902, the network device transmits a service request based on the selected service to the partner network device in operation 903. At this time, a service request including the service ID information of the service desired to be requested can be transmitted to the partner network device. Also, when the service request is transmitted, a service request frame is formed and based on the formed service request frame, the service request is transmitted as described above with reference to FIGS. 2 and 5.

Figure 10:
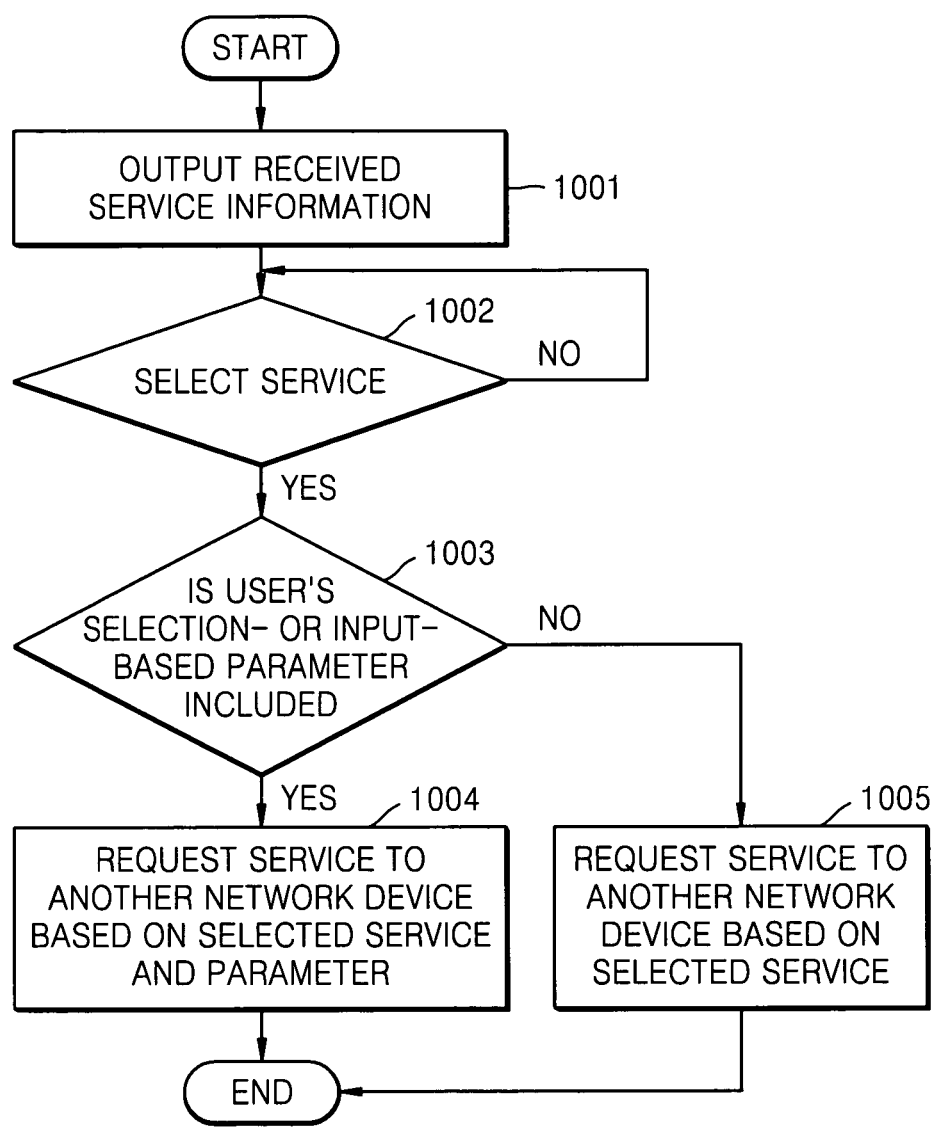
FIG. 10 is another detailed flowchart illustrating an operation of requesting services shown in FIG. 8 according to an exemplary embodiment of the present invention.

In order to transmit the service request, the network device can operate as illustrated in FIG. 10. FIG. 10 is another detailed flowchart illustrating an operation of requesting service shown in FIG. 8.

Referring to FIG. 10, the network device outputs the received service information in operation 1001. The service information can be output in the manner as described above with reference to FIGS. 2 through 4 and FIG. 9.

If the user selects one service based on the output service information in operation 1002, it is checked whether a user's selection- or input-based parameter is included in the service selected by the user in operation 1003. The user's selection- or input-based parameter is the same as the user's selection- or input-based parameter described above with reference to FIGS. 3 and 4. The parameter can include a parameter name, parameter ID information and a parameter value.

If the determination result in operation 1003 indicates that the user's selection- or input-based parameter is included in the service selected by the user, a service request based on the selected service and parameter is transmitted to the partner network device in operation 1004. That is, if the services, such as "Play" and "PIP view", described above with reference to FIGS. 3 and 4, are selected, user's selection- or input-based parameter is included in the selected service and therefore, the service request based on the selected service and parameter is transmitted to the partner network device. At this time, the service request can be transmitted to the partner network device, based on a service request frame including the service ID information and parameter ID information of the selected service. The service request includes a parameter value. The parameter value may be input or selected by the user. The service request frame can be generated as described above with reference to FIGS. 2 and 5.

However, if the determination result of operation 1003 indicates that a user's selection- or input-based parameter is not included in the service selected by the user, a service request based on the selected service is transmitted to the partner network device in operation 1005. That is, if a service, such as "Stop", described above with reference to FIGS. 3 and 4, is selected, a user's selection- or input-based parameter is not included in the selected service, and therefore, a service request based on the selected service is transmitted to the partner network device. A service request frame can be formed based on the service selected in operation 1005 and based on the formed service request frame, a service request can be transmitted. The service request frame can be formed as described above with reference to FIGS. 2 and 5.

Figure 11:
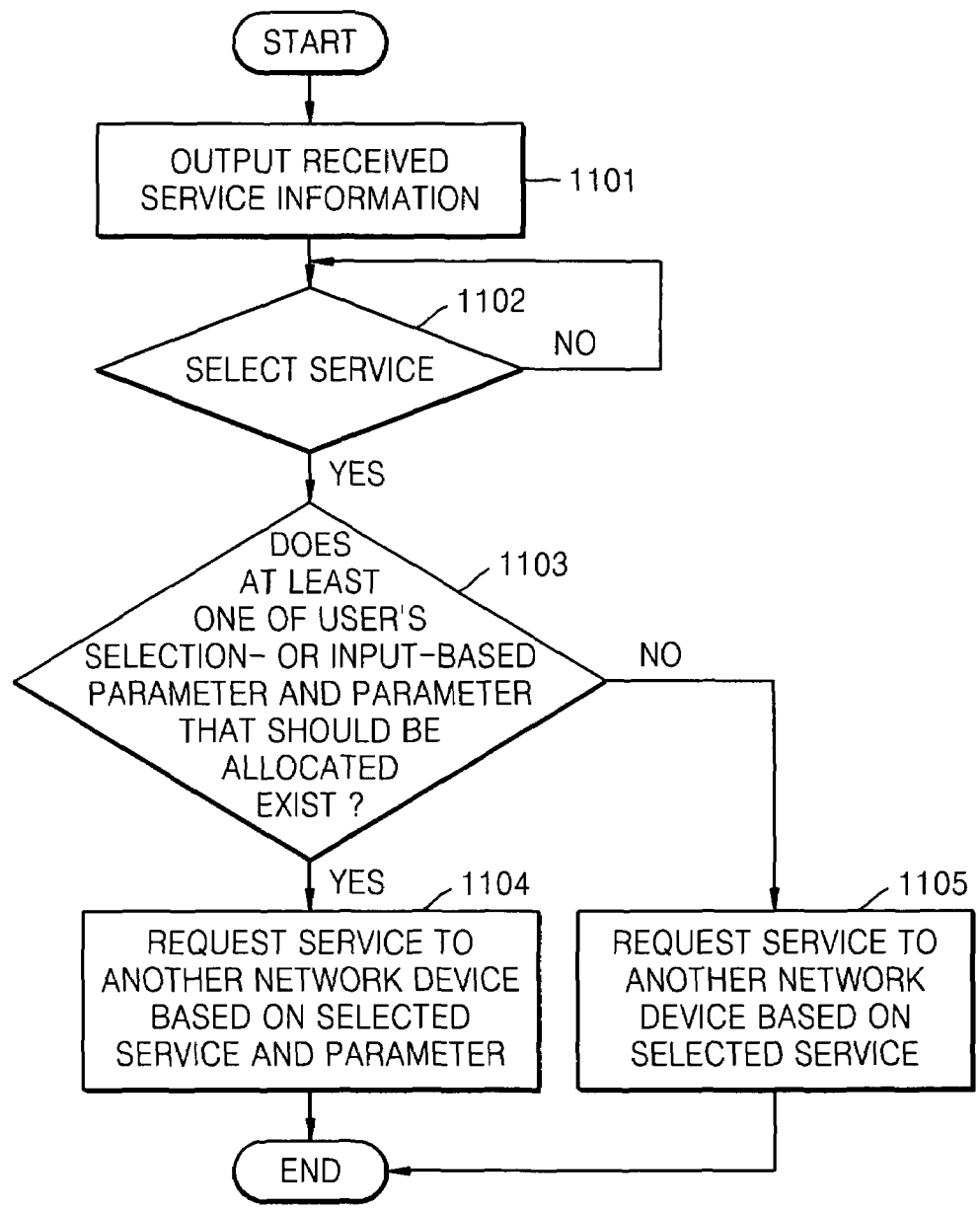
FIG. 11 is still another detailed flowchart illustrating an operation of requesting services shown in FIG. 8 according to an exemplary embodiment of the present invention.

In order to transmit a service request, the network device can operate as illustrated in FIG. 11. FIG. 11 is still another detailed flowchart illustrating an operation of requesting service shown in FIG. 8.

Referring to FIG. 11, the network device outputs received service information in operation 1101. The service information can be output in the manner as described above with reference to FIGS. 2 through 4.

If the user selects one service based on the output service information in operation 1102, the network device checks whether or not at least one of a user's selection- or input-based parameter and a parameter that should be allocated dynamically between the network device and the partner network device exists in the service selected by the user in operation 1103.

If at least one of a user's selection- or input-based parameter and a parameter that should be allocated dynamically between the network device and the partner network device exists, the network device transmits a service request to the partner network device, based on the selected service and parameter in operation 1104. The parameter that should be allocated dynamically is a parameter (for example, stream ID information) that does not need user's input or selection and should be allocated dynamically as described above with reference to FIG. 3.

If it is determined in operation 1103 that at least one of a user's selection- or input-based parameter and a parameter that should be allocated dynamically between the network device and the partner network device does not exist, the network device transmits a service request to the partner network device, based on the selected service in operation 1105.

When a service request is transmitted to the partner network device based on the process described above with reference to FIGS. 9 through 11, a service request frame as illustrated in FIG. 5 can be formed and based on the formed service request frame, a service request can be transmitted. In the service request frame, as described above with reference to FIG. 5, whether or not to add a parameter field to a frame to be transmitted to the partner network device is determined according to whether or not a parameter that should be transmitted to the partner network device exists.

As described above with reference to FIG. 8, if the service is requested based on the selected service information and then, a service response from the partner network device is received, the operation of requesting a service is finished in operation 804. However, the process of FIG. 8 can be implemented so that based on the received service response, information on whether or not the service requested by the user is performed by the partner network device is provided to the user and the process of requesting a service is finished.

Figure 12:
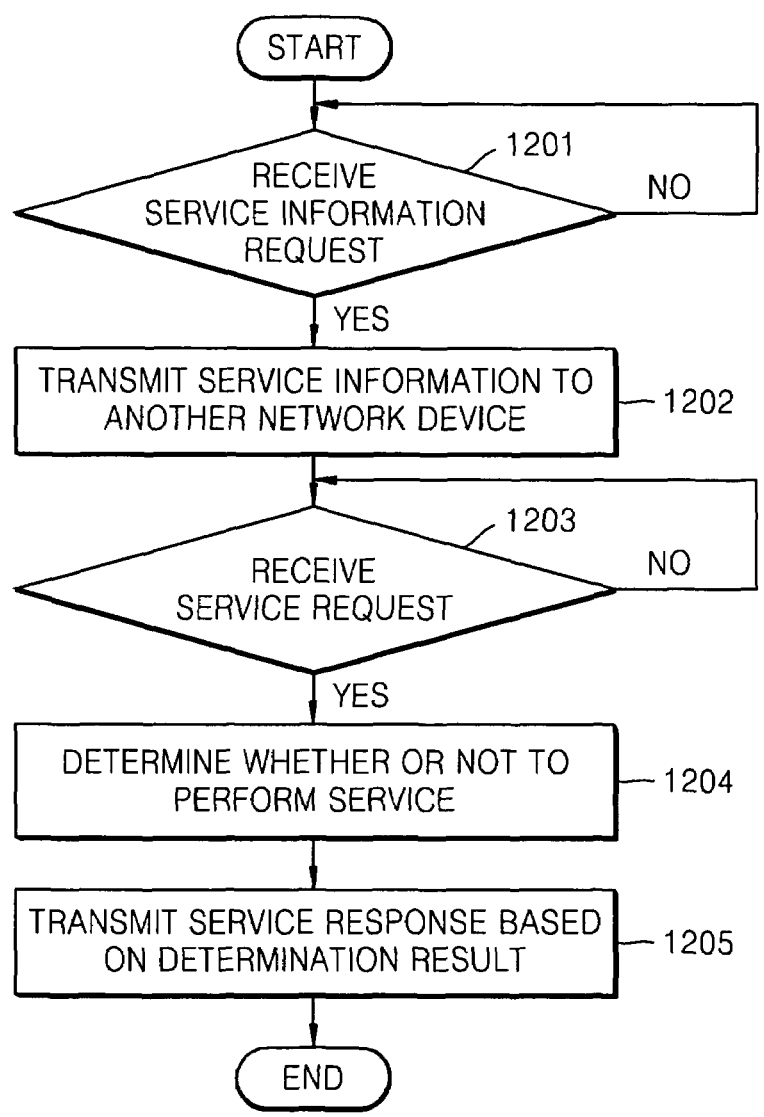
FIG. 12 is a flowchart of operations performed by a service request reception side in a method of requesting services between network devices according to another exemplary embodiment of the present invention.

FIG. 12 is a flowchart of operations performed by a service request reception side in a method of requesting service that can be used between network devices according to another exemplary embodiment of the present invention.

If a service information request from the partner network device is received in operation 1201, the network device transmits service information based its function to the partner network device in operation 1202. In FIG. 12, the partner network device is a device controlling the network device, and the network device is a device controlled by the partner network device. The service information can include a service description based on the function of the network device.

If a service request from the partner network device is received in operation 1203, the network device determines whether or not the requested service is performed in operation 1204. The network device transmits a service response based on the determination result, to the partner network device in operation 1205.

The method of requesting a service that can be used between network devices according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to exemplary embodiments of the present invention, a service request between network devices is performed based on the function of the partner network device (or the partner network device) such that the service range between the network devices can be flexibly managed.

Furthermore, according to exemplary embodiments of the present invention, a service that can be provided between network devices is not defined in advance and even when a network device having a new function is connected, or a new function is added to existing network devices, an active service request between network devices can be performed and therefore active services between network devices is enabled.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of requesting a service between network devices, wherein the service is not defined in advance between the network devices, comprising:

requesting, by a network device, to send service information to a partner network, wherein the service information comprises a service description based on user interface menu items according to a function of the partner network device;

wherein the service description comprises a service name, service identification (ID) information, and a parameter able to be selected or inputted by a user of the network device;

receiving the service information from the partner network device;

storing the received service information in a storage module included in the network device;

outputting the received service information as a user interface menu screen on a user interface module included in the network device, wherein the user interface menu screen includes the user interface menu items;

selecting the service based on the menu screen;

detecting, from the storage module, service information corresponding to the service selected based on the menu screen;

forming a service request frame including the detected service information;

transmitting a service request based on the formed service request frame to the partner network device;

wherein the formed service request frame includes, the service ID information of the selected service.

2. The method of claim 1, wherein information on the parameter comprises a parameter name, parameter ID information, and a parameter value, wherein the formed services request frame includes, the parameter ID information of the parameter and the parameter value according to whether or not the parameter to be transmitted to the partner network device is in the service description.

3. The method of claim 1, further comprising:

transmitting service information based on user interface menu items according to a function of a network device to the partner network device according to receiving service information request from the partner network device;

determining whether a service requested by the partner network device can be performed according to receiving a service request from the partner network device; and transmitting a service response to the partner network device based on a result of the determining whether the requested service can be performed.

4. A network device comprising:

a transmission and reception module which transmits and receives service information between the network device and a partner network device, wherein the service information comprises a service description based on user interface menu items according to a function of the network device and a function of the network device and a function of the partner network device, and the service information is to perform a service that is not defined in advance between network device and the partner network device;

wherein the service description comprises a service name, service identification (ID) information, and a parameter able to be selected or inputted by a user of the network device, a storage module which stores the service information received from the partner network device;

a user interface module which outputs the service information of the partner network device received through the transmission and reception module as a user interface menu screen and receives a selection for a service based on the user interface menu screen, wherein the user interface menu screen includes the user interface menu items; and a service request module which transmits a service information request to the partner network device through the transmission and reception module, stores the service information in the storage module and outputs the service information on the user interface module as the user interface menu screen according to receiving the service information of the partner network device, and detects, from the storage module, service information corresponding to a service selected based on the user interface menu screen, forms a service request frame including the detected service information, and transmits a service request based on the formed service request frame to the partner network device through the transmission and reception module;

wherein the formed service request frame includes, the service ID information of the selected service.

5. The device of claim 4, wherein the information on the parameter comprises a parameter name, parameter ID information, and a parameter value, wherein the formed service request frame includes the parameter ID information of the parameter and the parameter value according to whether or not the parameter to be transmitted to the partner network device is in the service description.

6. The device of claim 4, wherein the storage module further stores service information based on user interface menu items according to a function of the network device, and the network device further comprises a service response module which transmits service information based on the user interface menu items according to the function of the network device stored in the storage module, to the partner network device through the transmission and reception module according to receiving a service information request from the partner network device is received through the transmission and reception module, determines whether a service requested by the partner network device can be performed according to receiving a service request from the partner network device, and transmits a service response to the partner network device through the transmission and reception module based on a result of the determining whether the service requested by the partner network device can be performed.

7. A non-transitory computer storage medium having embodied thereon a computer program for executing a method of requesting service between network devices, wherein the service is not defined in advance between the network devices, wherein the method comprises:

requesting, by a network device, to send service information to a partner network device, the service information comprises a service description based on user interface menu items according to a function of the partner network device;

wherein the service description comprises a service name, service identification (ID) information, and a parameter able to be selected or inputted by a user of the network device;

receiving the service information from the partner network device; storing the received service information in a storage module included in the network device and outputting the received service information as a user interface menu screen on a user interface module included in the network device, wherein the user interface menu screen includes the user interface menu items;

selecting the service based on the user interface menu screen;

detecting, from the storage module, service information corresponding to the service selected based on the user interface menu screen;

forming a service request frame including the detected service information;

transmitting a service request based on the formed service request frame to the partner network device;

wherein the formed service request frame includes, the service ID information of the selected service.

8. The non-transitory computer storage recording medium of claim 7, further comprising:

transmitting service information based on user interface menu items according to a function of a network device to the partner network device according to receiving service information request from the partner network device; and determining whether a requested service can be performed according to receiving a service request from the partner network device; and transmitting a service response to the service request, to the partner network device based on a result of the determining whether the requested service can be performed.

9. The method of claim 2, wherein the parameter value field includes a filename selected by the user.

10. The device of claim 5, wherein the parameter value field includes a filename selected by the user.

11. The non-transitory computer storage recording medium of claim 7, wherein information on the parameter comprises a parameter name, parameter ID information, and a parameter value,
   wherein the formed service request flame includes the parameter ID information of the parameter and the parameter value according to whether or not the parameter to be transmitted to the partner network device is in the service description.

\* \* \* \* \*